United States Patent
Akatsuka

(10) Patent No.: US 12,492,108 B2
(45) Date of Patent: Dec. 9, 2025

(54) INDUSTRIAL VEHICLE

(71) Applicant: KABUSHIKI KAISHA TOYOTA JIDOSHOKKI, Kariya (JP)

(72) Inventor: Keisuke Akatsuka, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 207 days.

(21) Appl. No.: 18/118,360

(22) Filed: Mar. 7, 2023

(65) Prior Publication Data

US 2023/0286787 A1 Sep. 14, 2023

(30) Foreign Application Priority Data

Mar. 9, 2022 (JP) .................... 2022-036151

(51) Int. Cl.
*B66F 9/075* (2006.01)
*G05D 1/00* (2024.01)

(52) U.S. Cl.
CPC .......... *B66F 9/0755* (2013.01); *G05D 1/0214* (2013.01); *B66F 9/07509* (2013.01)

(58) Field of Classification Search
CPC ............................ G05D 1/0214; B66F 9/0755
USPC ............................................................ 701/26
See application file for complete search history.

(56) References Cited

U.S. PATENT DOCUMENTS

| 4,768,636 A | 9/1988 | Ito et al. |
| 2016/0264387 A1 | 9/2016 | Yoon et al. |
| 2017/0337820 A1* | 11/2017 | Glatfelter ............... G08G 1/166 |
| 2022/0179425 A1* | 6/2022 | Lin ....................... G05D 1/0246 |

FOREIGN PATENT DOCUMENTS

| EP | 2138742 B1 * | 3/2013 | ............ B60W 10/06 |
| JP | 62-027296 A | 2/1987 | |
| JP | H02-95936 A | 4/1990 | |
| JP | 2006-322413 A | 11/2006 | |
| JP | 2019-11149 A | 1/2019 | |
| JP | 2022-12369 A | 1/2022 | |
| KR | 10-2015-0048064 A | 5/2015 | |

OTHER PUBLICATIONS

Communication issued May 20, 2025 in Korean Application No. 10-2023-0029093.
Communication issued Mar. 11, 2025 in Japanese Application No. 2022-036151.

* cited by examiner

*Primary Examiner* — Navid Z. Mehdizadeh
*Assistant Examiner* — Vincent Feng
(74) *Attorney, Agent, or Firm* — Sughrue Mion, PLLC

(57) ABSTRACT

An industrial vehicle includes a travel direction detector configured to detect a travel direction of the industrial vehicle, a vehicle speed sensor configured to detect a vehicle speed of the industrial vehicle, a travel direction determiner, an object detector, and a controller. The controller is set in a particular state when the vehicle speed of the industrial vehicle is equal to or higher than a first vehicle speed threshold value. In the particular state, even when a travel direction command is changed by the travel direction determiner, the controller recognizes that a traveling state of the industrial vehicle before the travel direction command is changed continues and the object detector operates based on the traveling state of the industrial vehicle before the travel direction command is changed.

5 Claims, 8 Drawing Sheets

INDUSTRIAL VEHICLE

CROSS-REFERENCE TO RELATED APPLICATION

This application claims priority to Japanese Patent Application No. 2022-036151 filed on Mar. 9, 2022, the entire disclosure of which is incorporated herein by reference.

BACKGROUND ART

The present disclosure relates to an industrial vehicle.

An industrial vehicle disclosed in Japanese Patent Application Publication No. 2006-322413 includes a controller, a direction sensor, and a direction lever. The controller controls the industrial vehicle. The direction sensor detects an operation direction of the direction lever determining a travel direction of the industrial vehicle. The direction sensor detects whether the direction lever is operated in a direction indicating a forward travel or a direction indicating a rearward travel, with respect to a neutral position as a reference position. The controller switches travel modes in response to an operation of the direction lever. The travel modes include a forward travel mode and a rearward travel mode. When the direction lever is in a forward position, the controller sets the industrial vehicle in the forward travel mode. When the direction lever is in a rearward position, the controller sets the industrial vehicle in the rearward travel mode. In a case in which a vehicle speed of the industrial vehicle is equal to or higher than a predetermined speed, even when a travel direction indicated by the direction lever is changed, the controller maintains the travel mode before the change. In this case, the travel direction indicated by the direction lever is opposite to a travel direction of the industrial vehicle.

The industrial vehicle may include an object detector. The object detector detects a position of an object present in a travel direction of the industrial vehicle. When the controller recognizes the travel direction indicated by the direction lever as the travel direction of the industrial vehicle, the travel direction recognized by the controller is opposite to the actual travel direction of the industrial vehicle from a point when a position of the direction lever is switched until a point when the travel direction of the industrial vehicle is switched. Here, the controller may not recognize the object present in the actual travel direction of the industrial vehicle.

In accordance with an aspect of the present disclosure, there is provided an industrial vehicle that includes a travel direction detector configured to detect a travel direction of the industrial vehicle, a vehicle speed sensor configured to detect a vehicle speed of the industrial vehicle, a travel direction determiner configured to determine the travel direction of the industrial vehicle, an object detector configured to detect a position of an object present in the travel direction of the industrial vehicle, and a controller. The controller is set in a particular state when the vehicle speed of the industrial vehicle is equal to or higher than a first vehicle speed threshold value. In the particular state, even when a travel direction command is changed by the travel direction determiner, the controller recognizes that a traveling state of the industrial vehicle before the travel direction command is changed continues and the object detector operates based on the traveling state of the industrial vehicle before the travel direction command is changed.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment of an industrial vehicle according to the present disclosure.

<Forklift Truck>

Figure 1:
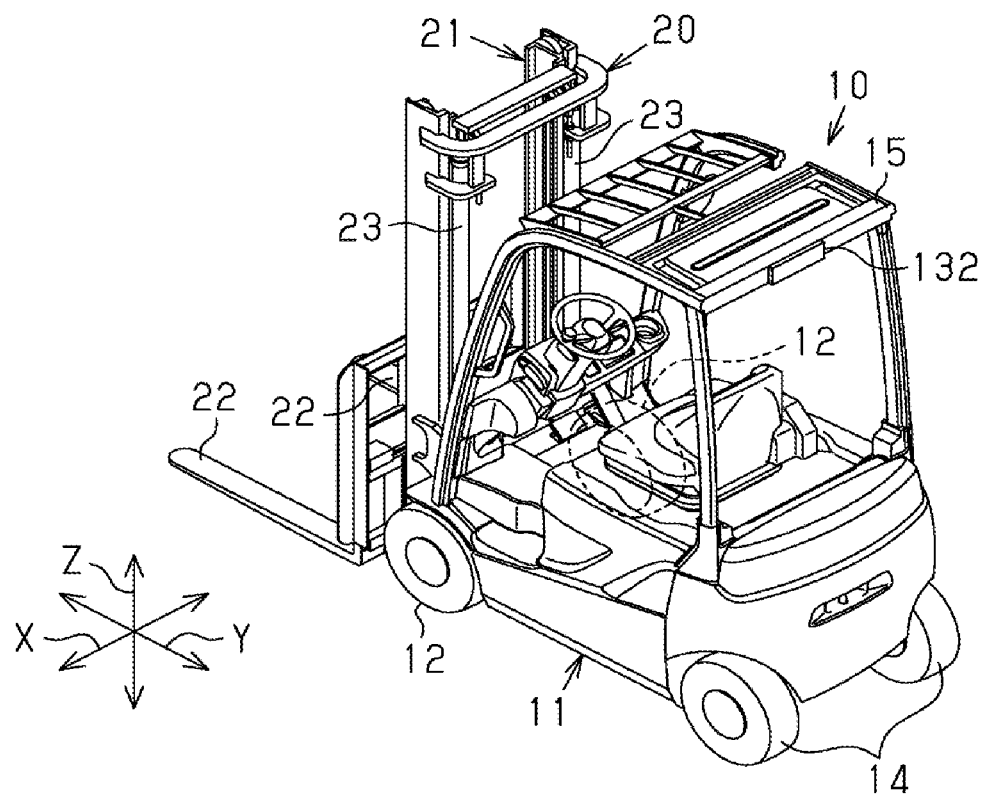
FIG. 1 is a perspective view of a forklift truck according to an embodiment of the present disclosure.

As illustrated in FIG. 1, a forklift truck 10 as an industrial vehicle includes a vehicle body 11, two driving wheels 12, two steering wheels 14, and a load handling apparatus 20. In the following description, terms of "front/rear", "forward/rearward", and "right/left" indicate orientations of the forklift truck 10.

The vehicle body 11 includes an overhead guard 15 provided at an upper portion of a driver's seat. The two driving wheels 12 are arranged in a lower front portion of the vehicle body 11, and spaced from each other in a vehicle width direction. The two steering wheels 14 are arranged in a lower rear portion of the vehicle body 11, and spaced from each other in the vehicle width direction.

The load handling apparatus 20 includes a mast 21, a pair of forks 22, and a lift cylinder 23. The mast 21 is provided in a front portion of the vehicle body 11. The pair of forks 22 is movable up and down with the mast 21. A load is loaded on the pair of forks 22. The lift cylinder 23 is a hydraulic cylinder. The lift cylinder 23 is extendable and contractible to cause the mast 21 to move up and down. When the mast 21 moves up and down, the pair of forks 22 moves up and down accordingly. In the forklift truck 10 of the present embodiment, a driver performs a traveling operation and a load handling operation.

<Configuration of the Forklift Truck>

Figure 2:
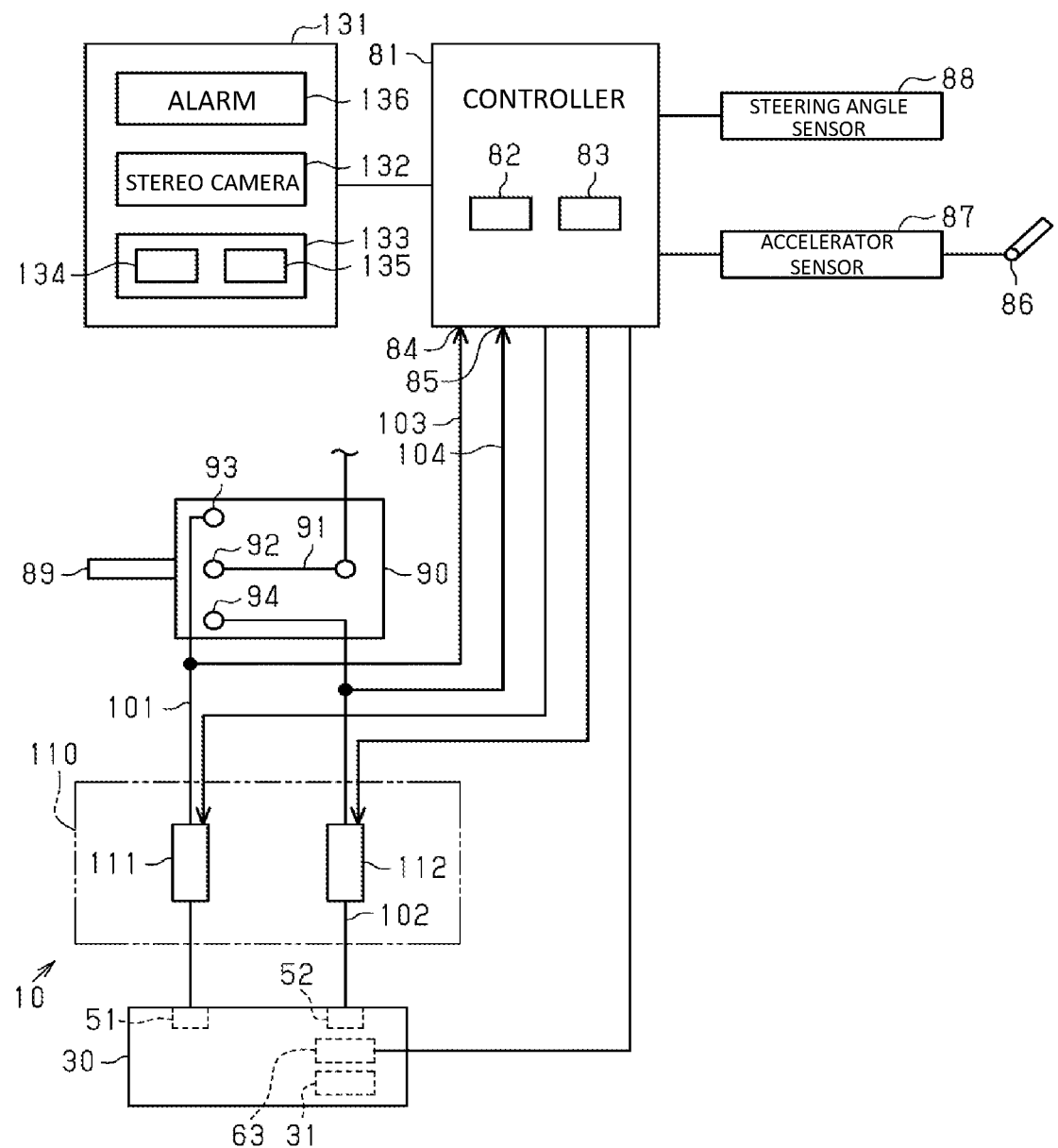
FIG. 2 is a block diagram schematically illustrating the forklift truck.

As illustrated in FIG. 2, the forklift truck 10 includes a traveling system 30, a controller 81, an accelerator 86, an accelerator sensor 87, a steering angle sensor 88, a direction lever 89, a direction switch 90, a forward connection line 101, a rearward connection line 102, a forward detection line 103, a rearward detection line 104, an interlock 110, and an object detector 131.

<Traveling System>

Figure 3:
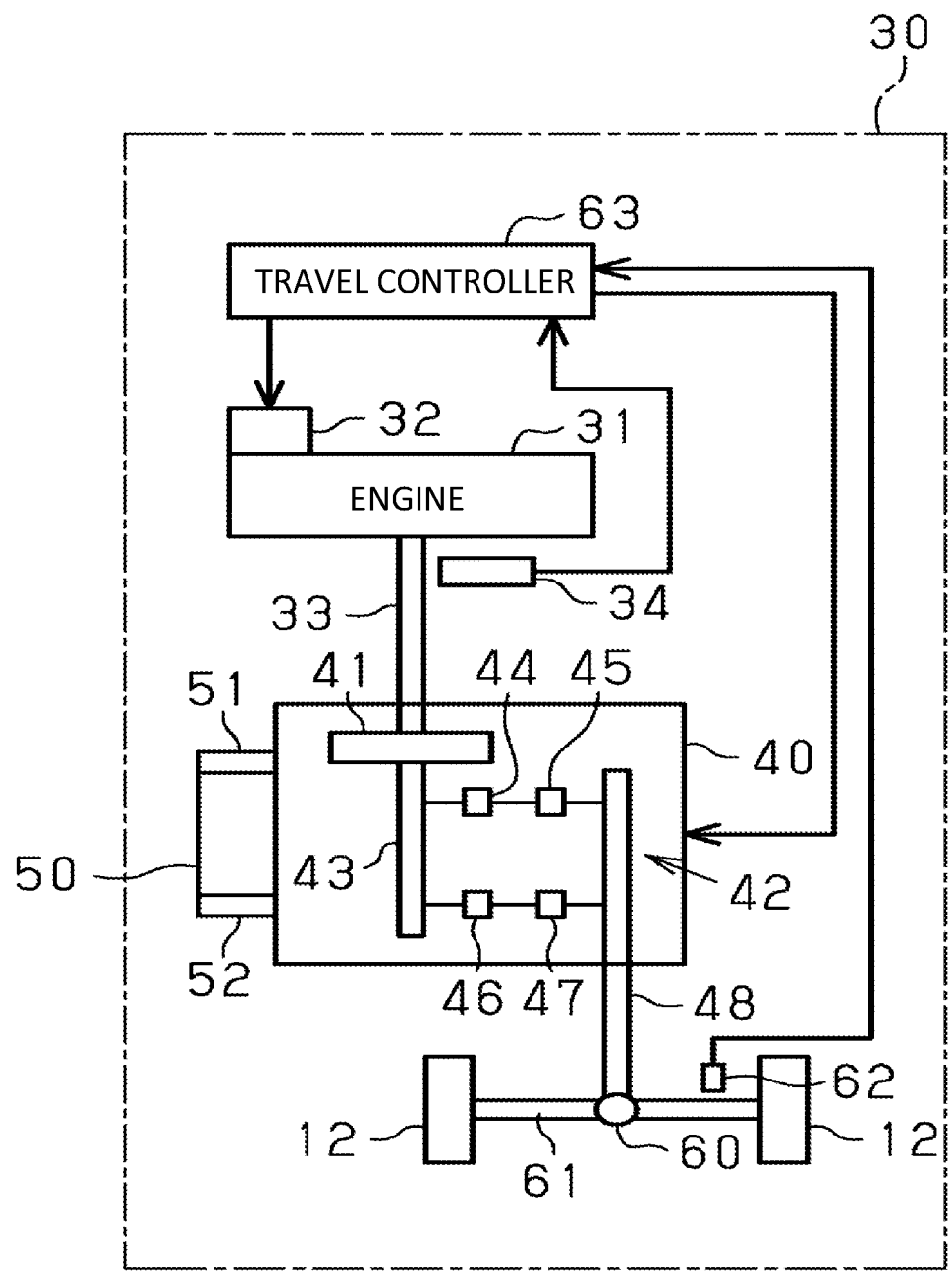
FIG. 3 is a block diagram schematically illustrating a traveling system of the forklift truck.

As illustrated in FIG. 3, the traveling system 30 is a mechanism for a travel of the forklift truck 10. The traveling system 30 includes an engine 31, an output shaft 33, a rotational speed sensor 34, a power transmission 40, a solenoid valve 50, a forward solenoid 51, a rearward solenoid 52, a differential 60, an axle 61, a vehicle speed sensor 62, and a travel controller 63.

The engine 31 is a drive source for the traveling operation and the load handling operation of the forklift truck 10. The engine 31 of the present embodiment is a gasoline engine using gasoline as fuel. The engine 31 includes a throttle actuator 32. The throttle actuator 32 adjusts a throttle opening degree of a throttle valve (not illustrated) provided in an intake passage such that a rotational speed of the engine 31 follows a target rotational speed of the engine 31 calculated from an opening degree of the accelerator 86. The throttle actuator 32 adjusts the throttle opening degree to adjust an amount of air supplied to the engine 31. Thus, the rotational speed of the engine 31 is controlled. The engine 31 may be a diesel engine using diesel oil as fuel, or may be an engine using liquefied petroleum gas or compressed natural gas as fuel. The output shaft 33 is connected to the engine 31. The engine 31 is driven to rotate the output shaft 33.

The rotational speed sensor 34 is provided in the output shaft 33. The rotational speed sensor 34 detects the rotational speed of the engine 31. The rotational speed of the engine 31 corresponds to a rotational speed of the output shaft 33. The rotational speed sensor 34 outputs electric signals in accordance with the rotational speed of the output shaft 33 to the travel controller 63.

The power transmission 40 is configured to transmit a driving force of the engine 31 to the driving wheels 12. The power transmission 40 includes a torque converter 41 and a transmission 42.

The torque converter 41 is connected to the output shaft 33. The driving force of the engine 31 is transmitted to the torque converter 41 through the output shaft 33. The torque converter 41 includes a pump connected to the output shaft 33, and a turbine. In the torque converter 41, hydraulic oil discharged from the pump rotates the turbine.

The transmission 42 includes an input shaft 43, a forward clutch 44, a forward gear train 45, a reverse clutch 46, a reverse gear train 47, and an output shaft 48. The input shaft 43 is connected to the torque converter 41. The driving force of the engine 31 is transmitted from the torque converter 41 to the transmission 42 through the input shaft 43.

The forward clutch 44 is provided in the input shaft 43. The forward gear train 45 is provided between the forward clutch 44 and the output shaft 48. The forward clutch 44 is switchable between a connection state and a disconnection state. The connection state is a state where the input shaft 43 is connected to the forward gear train 45. The disconnection state is a state where the input shaft 43 is disconnected from the forward gear train 45. When the input shaft 43 is connected to the forward gear train 45 via the forward clutch 44, the driving force of the engine 31 is transmitted from the input shaft 43 to the forward gear train 45. Then, the driving force transmitted to the forward gear train 45 is transmitted to the output shaft 48. When the forward clutch 44 is connected to the forward gear train 45, the driving force of the engine 31 is transmitted to the output shaft 48. When the forward clutch 44 is disconnected from the forward gear train 45, the driving force of the engine 31 is not transmitted from the input shaft 43 to the forward gear train 45. A hydraulic clutch is used as the forward clutch 44. The hydraulic clutch is a wet multi-plate clutch, for example.

The reverse clutch 46 is provided in the input shaft 43. The reverse gear train 47 is provided between the reverse clutch 46 and the output shaft 48. The reverse clutch 46 is switchable between a connection state and a disconnection state. The connection state is a state where the input shaft 43 is connected to the reverse gear train 47. The disconnection state is a state where the input shaft 43 is disconnected from the reverse gear train 47. When the input shaft 43 is connected to the reverse gear train 47 via the reverse clutch 46, the driving force of the engine 31 is transmitted from the input shaft 43 to the reverse gear train 47. Then, the driving force transmitted to the reverse gear train 47 is transmitted to the output shaft 48. When the reverse clutch 46 is connected to the reverse gear train 47, the driving force of the engine 31 is transmitted to the output shaft 48. When the reverse clutch 46 is disconnected from the reverse gear train 47, the driving force of the engine 31 is not transmitted from the input shaft 43 to the reverse gear train 47. A hydraulic oil clutch is used as the reverse clutch 46. The hydraulic clutch is a wet multi-plate clutch, for example.

The solenoid valve 50 controls a supply and a discharge of the hydraulic oil to and from the forward clutch 44 and the reverse clutch 46, which switches each of the clutches 44, 46 between the connection state and the disconnection state.

The solenoids 51, 52 respectively switch the supply and the discharge of the hydraulic oil to and from the clutches 44, 46 by the solenoid valve 50. When the forward solenoid 51 is energized, the hydraulic oil is supplied to the forward clutch 44 through the solenoid valve 50. When the hydraulic oil is supplied to the forward clutch 44, the forward clutch 44 is in the connection state. When the rearward solenoid 52 is energized, the hydraulic oil is supplied to the reverse clutch 46 through the solenoid valve 50. When the hydraulic oil is supplied to the reverse clutch 46, the reverse clutch 46 is in the connection state.

The solenoid valve 50 may be one electromagnetic directional switching valve. When the forward solenoid 51 is energized, a spool of the electromagnetic directional switching valve is switched to a position where the hydraulic oil is supplied to the forward clutch 44. When the rearward solenoid 52 is energized, the spool of the electromagnetic directional switching valve is switched to a position when the hydraulic oil is supplied to the rearward clutch 46. When the forward solenoid 51 and the rearward solenoid 52 are de-energized, the spool of the electromagnetic directional switching valve is switched to a position where the hydraulic oil is discharged from the clutches 44, 46. The hydraulic oil for operating the forward clutch 44 and the reverse clutch 46 is supplied to the forward clutch 44 and the reverse clutch 46 by a hydraulic pump positioned inside the power transmission 40. The hydraulic pump has a known configuration.

Two solenoid valves may be used as the solenoid valve 50. The two solenoid valves are provided in correspondence with the forward clutch 44 and the reverse clutch 46, respectively. In this case, the forward solenoid 51 and the rearward solenoid 52 each control the solenoid valve 50 individually, so that the hydraulic oil is supplied to and discharged from the clutches 44, 46.

The power transmission 40 is switchable between a driving force transmission state where the driving force of the engine 31 is transmitted to the power transmission 40 and a driving force non-transmission state where the driving force of the engine 31 is not transmitted to the power transmission 40. When one of the forward clutch 44 and the reverse clutch 46 is in the connection state, the driving force of the engine 31 is transmitted to the power transmission 40, thereby causing the forklift truck 10 to travel. The driving force transmission state corresponds to a state where one of the forward clutch 44 and the reverse clutch 46 is in the connection state. When the forward clutch 44 and the reverse clutch 46 are in the disconnection state, the driving force of the engine 31 is not transmitted to the power transmission 40. The driving force non-transmission state corresponds to a state where the forward clutch 44 and the reverse clutch 46 are in the disconnection state.

The differential 60 is connected to the output shaft 48. The axle 61 is connected to the differential 60. The driving wheels 12 are connected to the axle 61. The axle 61 rotates with the rotation of the output shaft 48. The driving wheels 12 rotate with the rotation of the axle 61 to cause the forklift truck 10 to travel. When the forward clutch 44 is connected to the forward gear train 45, the forklift truck 10 travels forward. When the reverse clutch 46 is connected to the reverse gear train 47, the forklift truck 10 travels rearward.

The vehicle speed sensor 62 is a sensor for detecting a vehicle speed of the forklift truck 10. The vehicle speed sensor 62 is provided in the output shaft 48, the axle 61, or the like. The vehicle speed sensor 62 outputs pulse signals in accordance with the vehicle speed of the forklift truck 10 to the travel controller 63.

The travel controller 63 is an engine control unit configured to control the engine 31. The travel controller 63 controls the throttle actuator 32 to adjust the throttle opening degree. The driving force of the engine 31 is adjusted by the adjustment of the throttle opening degree.

<Controller>

As illustrated in FIG. 2, the controller 81 includes a processor 82 and a memory 83. The processor 82 is a CPU (Central Processing Unit), a GPU (Graphics Processing Unit), a DSP (Digital Signal Processor), or the like. The memory 83 includes a RAM (Random Access Memory) and a ROM (Read Only Memory). The memory 83 stores program codes or commands configured to cause the processor 82 to execute processes. The memory 83, that is, a computer readable medium, includes any available medium that is accessible by a general-purpose computer or a dedicated computer. The controller 81 may include a hardware circuit such as an ASIC (Application Specific Integrated Circuit) or an FPGA (Field Programmable Gate Array). The controller 81, which is a processing circuit, may include one or more processors for operating in accordance with computer programs, one or more hardware circuits such as the ASIC or the FPGA, or a combination thereof.

<Accelerator Sensor and Steering Angle Sensor>

The accelerator sensor 87 detects an operation amount of the accelerator 86. The operation amount of the accelerator 86 is also referred to as an accelerator opening degree. The accelerator sensor 87 outputs electric signals in accordance with the accelerator opening degree to the controller 81. The controller 81 receives the electric signals from the accelerator sensor 87 to recognize the accelerator opening.

The steering angle sensor 88 detects a steering angle of each steering wheel 14. The steering angle sensor 88 outputs electric signals in accordance with the steering angle to the controller 81. The controller 81 receives the electric signals from the steering angle sensor 88 to recognize the steering angle.

<Direction Lever>

The direction lever 89 determines a travel direction of the forklift truck 10. The direction lever 89 is operated by the driver of the forklift truck 10. The direction lever 89 is operated to be in a forward position indicating a forward travel or a rearward position indicating a rearward travel, with respect to a neutral position as a reference position. For example, the forward position is a position where the direction lever 89 is tilted forward from the neutral position, and the rearward position is a position where the direction lever 89 is tilted rearward from the neutral position. The direction lever 89 corresponds to a travel direction determiner in the present disclosure. The driver operates the direction lever 89 to give a travel direction command to the forklift truck 10. The travel direction command is a command which instructs the forklift truck 10 on the travel direction of the forklift truck 10. The travel direction command includes a forward travel command and a rearward travel command. The forward travel command is a command that instructs the forklift truck 10 to travel forward. The rearward travel command is a command that instructs the forklift truck 10 to travel rearward.

<Direction Switch>

The direction switch 90 is switched in accordance with an operation direction of the direction lever 89. The direction switch 90 includes one movable contact 91, and three fixed contacts 92, 93, 94. The movable contact 91 is connected to a positive electrode of a battery mounted on the forklift truck 10. The three fixed contacts 92, 93, 94 correspond to a neutral fixed contact 92, a forward fixed contact 93, and a rearward fixed contact 94, respectively. When the direction lever 89 is in the neutral position, the movable contact 91 is connected to the neutral fixed contact 92. When the direction lever 89 is in the forward position, the movable contact 91 is connected to the forward fixed contact 93. When the direction lever 89 is in the rearward position, the movable contact 91 is connected to the rearward fixed contact 94. The direction switch 90 corresponds to a travel direction detector configured to detect the travel direction of the forklift truck 10 in the present disclosure. The direction switch 90 may include three buttons corresponding to the forward position, the neutral position, and the rearward position, which are each operated to connect the movable contact 91 to the corresponding fixed contact.

<Forward Connection Line and Rearward Connection Line>

The forward connection line 101 connects the forward fixed contact 93 to the forward solenoid 51. When the movable contact 91 is connected to the forward fixed contact 93, the forward connection line 101 is electrically connected to the battery. With this connection, the forward solenoid 51 is energized. When the movable contact 91 is connected to the forward fixed contact 93, the rearward solenoid 52 is de-energized.

The rearward connection line 102 connects the rearward fixed contact 94 to the rearward solenoid 52. When the movable contact 91 is connected to the rearward fixed contact 94, the rearward connection line 102 is electrically connected to the battery. With this connection, the rearward solenoid 52 is energized. When the movable contact 91 is connected to the rearward fixed contact 94, the forward solenoid 51 is de-energized.

When the direction lever 89 is in the forward position, the forward solenoid 51 is energized to supply the hydraulic oil to the forward clutch 44. This enables the forklift truck 10 to travel forward. When the direction lever 89 is in the rearward position, the rearward solenoid 52 is energized to supply the hydraulic oil to the reverse clutch 46. This enables the forklift truck 10 to travel rearward. When the direction lever 89 is in the neutral position, the solenoids 51, 52 are de-energized. Thus, the hydraulic oil is not supplied to the clutches 44, 46. In this case, the driving force of the engine 31 is not transmitted to the power transmission 40.

<Forward Detection Line and Rearward Detection Line>

The forward detection line 103 connects the forward connection line 101 to the controller 81. When a voltage is applied from the battery to the forward connection line 101, the voltage is applied to the controller 81 through the forward detection line 103. The rearward detection line 104 connects the rearward connection line 102 to the controller 81. When the voltage is applied from the battery to the rearward connection line 102, the voltage is applied to the controller 81 through the rearward detection line 104. When the voltage is input from the forward detection line 103, the controller 81 determines that the direction lever 89 is in the forward position. When the voltage is input from the rearward detection line 104, the controller 81 determines that the direction lever 89 is in the rearward position. In detail, the controller 81 includes a port 84 that is connected to the forward detection line 103 and a port 85 that is connected to the rearward detection line 104. When the voltage is input to the port 84, the controller 81 determines that the direction lever 89 is in the forward position. When the voltage is input to the port 85, the controller 81 determines that the direction lever 89 is in the rearward position. When the voltage is not input from any of the forward detection line 103 and the rearward detection line 104, the controller 81 determines that the direction lever 89 is in the neutral position. When the direction lever 89 is in the forward position, the controller 81 determines that the forward travel command is input to the controller 81. When the direction lever 89 is in the rearward position, the controller 81 determines that the rearward travel command is input to the controller 81.

<Interlock>

The interlock 110 includes a forward relay 111 and a rearward relay 112. The forward relay 111 is provided in the forward connection line 101. The forward relay 111 is switched between a connection state and a disconnection state. When the forward relay 111 is in the connection state, the forward connection line 101 is electrically connected to the forward solenoid 51. When the forward relay 111 is in the disconnection state, the forward connection line 101 is electrically disconnected from the forward solenoid 51. The rearward relay 112 is provided in the rearward connection line 102. The rearward relay 112 is switched between a connection state and a disconnection state. When the rearward relay 112 is in the connection state, the rearward connection line 102 is electrically connected to the rearward solenoid 52. When the rearward relay 112 is in the disconnection state, the rearward connection line 102 is electrically disconnected from the rearward solenoid 52.

<Object Detector>

The object detector 131 includes a stereo camera 132, a detector 133, and an alarm 136. The stereo camera 132 includes two cameras and captures an image. As illustrated in FIG. 1, the stereo camera 132 is disposed in the overhead guard 15. The stereo camera 132 is disposed so as to capture an aerial view image of a road surface on which the forklift truck 10 travels, from above the forklift truck 10. The stereo camera 132 of the present embodiment captures a rear of the forklift truck 10. Thus, an object detected by the object detector 131 is located in the rear of the forklift truck 10. A direction in which the object detector 131 detects the object orients to the rear of the forklift truck 10. The alarm 136, the detector 133, and the stereo camera 132 may be made into a unit to be disposed on the overhead guard 15. The alarm 136 and the detector 133 may be disposed at a position different from a position where the overhead guard 15 is disposed.

The detector 133 includes a processor 134 and a memory 135. The processor 134 is a CPU, a GPU, or a DSP, for example. The memory 135 includes a RAM and a ROM. The memory 135 stores various programs for detecting an object in the image captured by the stereo camera 132. The memory 135 stores program codes or commands configured to cause the processor 134 to execute processes. The memory 135, that is, a computer readable medium, includes any available medium that is accessible by a general-purpose computer or a dedicated computer. The detector 133 may include a hardware circuit such as an ASIC or an FPGA. The detector 133, which is a processing circuit, may include one or more processors for operating in accordance with computer programs, one or more hardware circuits such as the ASIC or the FPGA, or a combination thereof.

<Object Detection Process>

The detector 133 detects the object present in the rear of the forklift truck by repeating an object detection process as described below in a predetermined control period. The detector 133 derives a position of the detected object. The position of the object is a relative position between the forklift truck 10 and the object.

Figure 4:
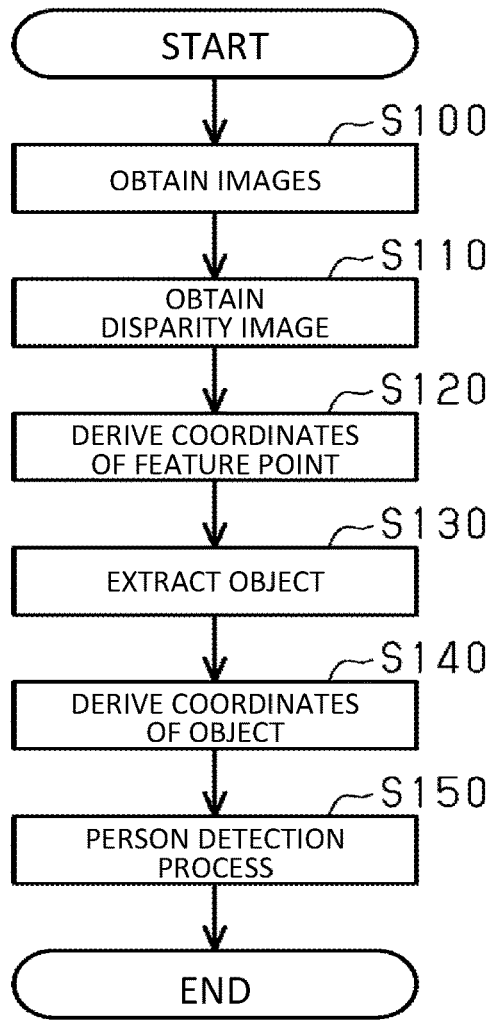
FIG. 4 is a flowchart showing an object detection process according to the embodiment.

As illustrated in FIG. 4, in Step S100, the detector 133 obtains an image from the stereo camera 132.

Next, in Step S110, the detector 133 performs a stereo process to obtain a disparity image. The disparity image is an image whose pixels are correlated with a disparity [px]. The disparity image is not necessarily visualized data, and corresponds to data in which the disparity is correlated with each pixel of the disparity image. Two images captured by the stereo camera 132 are compared with each other, and a difference in pixel counts between the two images is derived for the same feature point in each of the two images, so that a disparity is obtained. The feature point is a visually recognizable point as a border such as an edge of an obstacle. The feature point is detectable by using information of brightness, and the like.

Next, in Step S120, the detector 133 derives coordinates of the feature point in a world coordinate system corresponding to a coordinate system in a real space. The world coordinate system has an X-axis extending in the vehicle width direction of the forklift truck 10 when the forklift truck 10 is located on a horizontal surface, a Y-axis orthogonal to the X-axis of horizontal directions, and a Z-axis extending vertically. Coordinates of the feature point in a camera coordinate system is derived from a base line length of the stereo camera 132, a focal length of the stereo camera 132, and the disparity image obtained in Step S110. Such coordinates of the feature point in the camera coordinate system are transformed to coordinates of the feature point in the world coordinate system. Thus, the coordinates of the feature point are derived. As illustrated in FIG. 1, an X-axis direction, a Y-axis direction, and a Z-axis direction are represented by arrows X, Y, and Z.

As illustrated in FIG. 4, in Step S130, the detector 133 extracts an object by clustering the feature points. The detector 133 defines, as one point group, a set of feature points assumed to represent the same object among the feature points representing a part of the object, and extracts the one point group as the object. The detector 133 performs clustering to recognize the feature points positioned in a predetermined range as one point group based on the coordinates of the feature points in the world coordinate system derived in Step S120. The detector 133 recognizes the clustered point group as one object. The clustering of the feature points in Step S130 may be performed by various methods.

Next, in Step S140, the detector 133 derives coordinates of the object in the world coordinate system. The coordinates of the object are derivable from the coordinates of the feature points forming the point group. The coordinates of the object in the world coordinate system represent a relative position between the forklift truck 10 and the object. Specifically, regarding the coordinates of the object in the world coordinate system, an X-coordinate represents a distance from an origin to the object in the right-left direction, and a Y-coordinate represents a distance from the origin to the object in the front-rear direction. The origin corresponds to, for example, coordinates in which the X-coordinate and the Y-coordinate represent a position of the stereo camera 132 and a Z-coordinate represents the road surface. Euclidean distance from the position of the stereo camera 132 to the object is derivable from the X-coordinate and the Y-coordinate. The Z-coordinate of the coordinates of the object in the world coordinate system represents a height of the object from the road surface.

Next, in Step S150, the detector 133 performs a person detection process. The detector 133 determines whether the object is a person in the person detection process. In the present embodiment, the detector 133 performs the person detection process on an image captured by one of the two cameras of the stereo camera 132. The detector 133 transforms the coordinates of the object in the world coordinate system which are obtained in Step S140 into camera coordinates, and then, transforms the camera coordinates into coordinates of the image captured by the camera. The detector 133 performs the person detection process on the coordinates of the object in the image. The person detection process is, for example, performed using features. The detector 133 extracts features of the coordinates of the object on the image. A method of feature extraction is used, wherein features in a local area of an image, for example, HOG: Histogram of Oriented Gradients features and Haar-Like features, are extracted. The detector 133 determines whether the object is a person by comparing the features extracted from the image with dictionary data. The dictionary data is, for example, data of features extracted from a plurality of image data on which a person is captured. In the following description, the object other than a person may be called an obstacle.

<Alarm>

The alarm 136 is a device that issues an alarm to the driver of the forklift truck 10. Examples of the alarm 136 include a buzzer that emits sounds, a lamp that emits light, and a combination thereof.

<Control Performed by Controller>

The controller 81, the travel controller 63, and the object detector 131 obtain information from each other. The controller 81, the travel controller 63, and the object detector 131 obtain the information from each other through communication in accordance with a communication protocol for the vehicle, such as CAN (Controller Area Network) or LIN (Local Interconnect Network).

The controller 81 derives the vehicle speed of the forklift truck 10. The vehicle speed of the forklift truck 10 is derivable from a detection result of the vehicle speed sensor 62, a gear ratio, an outer diameter of each driving wheel 12, the steering angle detected by the steering angle sensor 88, and the like. The detection result of the vehicle speed sensor 62 is obtainable from the travel controller 63. The memory 83 only need store the gear ratio and the outer diameter of each driving wheel 12 in advance. In the following description, the vehicle speed means the vehicle speed of the forklift truck 10.

The controller 81 switches the forward relay 111 and the rearward relay 112 between the connection state and the disconnection state. When a switchback operation is not performed, the controller 81 sets the forward relay 111 and the rearward relay 112 in the connection state. When the switchback operation is performed at the vehicle speed equal to or higher than a second vehicle speed threshold value, the controller 81 sets the forward relay 111 and the rearward relay 112 in the disconnection state. In response to the vehicle speed lower than the second vehicle speed threshold value, the controller 81 sets the forward relay 111 and the rearward relay 112 in the connection state. In the switchback operation, the direction lever 89 is operated to switch the travel direction command from the forward travel command to the rearward travel command or from the rearward travel command to the forward travel command. When each of the forward relay 111 and the rearward relay 112 is in the disconnection state, the solenoids 51, 52 are de-energized regardless of the position of the direction lever 89, so that the driving force of the engine 31 is not transmitted to the power transmission 40. That is, the power transmission 40 is set in the driving force non-transmission state. This reduces a load on the power transmission 40 when the switchback operation is performed at the vehicle speed equal to or higher than the second vehicle speed threshold value. As the second vehicle speed threshold value is lower, the load on the power transmission 40 is reduced. On the other hand, as the second vehicle speed threshold value is lower, a time from a point when the direction lever 89 is operated until the travel direction of the forklift truck 10 is switched becomes longer in the switchback operation. The second vehicle speed threshold value may be set to any value based on these factors.

The controller 81 transmits an alarm command to the object detector 131 to activate the alarm 136. Specifically, the object detector 131 includes an activation portion configured to activate the alarm 136 upon reception of the alarm command.

<Alarm Area>

The controller 81 performs an alarm control. In the alarm control, while the forklift truck 10 travels, the alarm 136 issues an alarm depending on a status of object detection by the object detector 131. Firstly, the following will describe an alarm area used for the alarm control.

Figure 5:
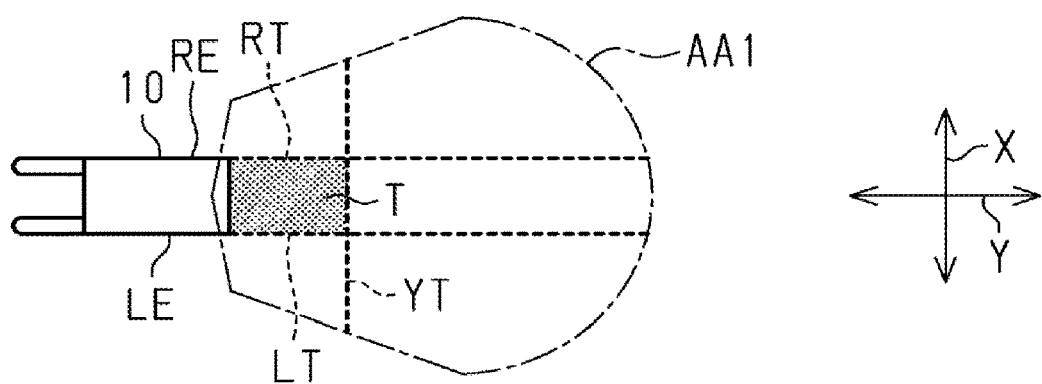
FIG. 5 is a schematic view illustrating a predicted orbit of the forklift truck.

As illustrated in FIG. 5, an alarm area AA1 used for the alarm control is set within an object detectable range of the object detector 131. The object detectable range of the object detector 131 corresponds to an imaging range to be captured by the stereo camera 132. In the present embodiment, the alarm area AA1 is the same area as the object detectable range of the object detector 131. The alarm area AA1 expands from the position of the stereo camera 132 toward the rear of the forklift truck 10, and extends in the vehicle width direction of the forklift truck 10. The alarm area AA1 is defined by the X-coordinate and the Y-coordinate in the world coordinate system.

<Predicted Orbit>

The controller 81 derives a predicted orbit T of the forklift truck 10. The predicted orbit T is an orbit on which the forklift truck 10 is predicted to pass. In the present embodiment, the controller 81 derives the predicted orbit T on which the forklift truck 10 is predicted to pass when the travel direction of the forklift truck is a rearward travel direction.

The predicted orbit T is derived from the steering angle of each steering wheel 14 and size information of the forklift truck 10. The size information of the forklift truck 10 includes a size [mm] from a central axis of each driving wheel 12 to a rear end of the vehicle body 11, a wheelbase [mm], and a vehicle width [mm]. Since the size information of the forklift truck 10 is predetermined, the size information may be stored in the memory 83 of the controller 81, or the like in advance. The predicted orbit T is formed between an orbit LT on which a left end LE of the vehicle body 11 passes and an orbit on which a right end RE of the vehicle body 11 passes. The controller 81 derives the X-coordinate and the Y-coordinate of the predicted orbit T extending rearward from the forklift truck 10 in the world coordinate system.

Figure 6:
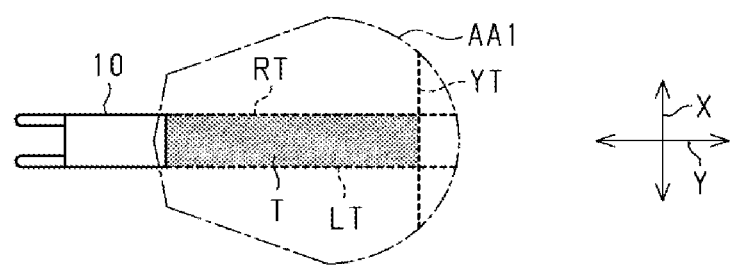
FIG. 6 is a schematic view illustrating a predicted orbit of the forklift truck.
Figure 7:
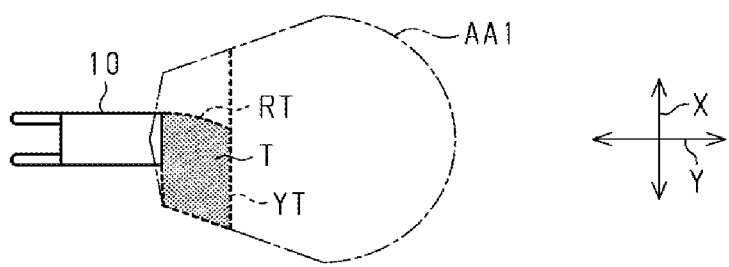
FIG. 7 is a schematic view illustrating a predicted orbit of the forklift truck.
Figure 8:
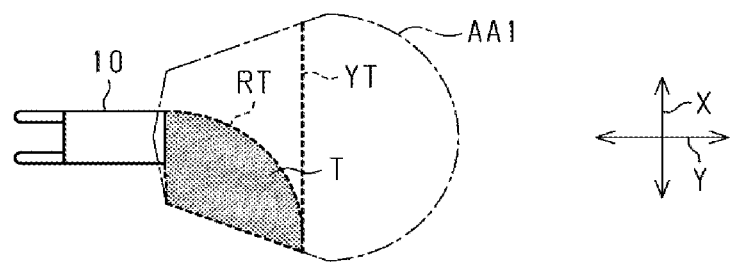
FIG. 8 is a schematic view illustrating a predicted orbit of the forklift truck.

As illustrated in FIGS. 5 and 6, when the forklift truck 10 travels straight, the predicted orbit T extends in the rear travel direction of the forklift truck 10 therefrom. As illustrated in FIGS. 7 and 8, when the forklift truck 10 turns, the predicted orbit T turns in the rear travel direction of the forklift truck 10 therefrom. When the forklift truck 10 turns in a right direction, the predicted orbit T extends in the right direction. When the forklift truck 10 turns in a left direction, the predicted orbit T extends in the left direction. That is, when the forklift truck 10 turns, the controller 81 derives the predicted orbit T extending in a turning direction of the forklift truck 10.

The forklift truck 10 illustrated in FIG. 6 has the vehicle speed higher than that of the forklift truck 10 illustrated in FIG. 5. Similarly, the forklift truck 10 illustrated in FIG. 8 has the vehicle speed higher than that of the forklift truck 10 illustrated in FIG. 7. As illustrated in FIGS. 5 to 8, the controller 81 has the predicted orbit T that extends longer in the travel direction of the forklift truck 10 as the vehicle speed of the forklift truck 10 is higher. In the present embodiment, an orbit derived threshold value YT changes depending on the vehicle speed of the forklift truck 10. The orbit derived threshold value YT is set for the Y-coordinate in the world coordinate system, and the Y-coordinate of the orbit derived threshold value YT is further distant from the forklift truck 10 as the vehicle speed of the forklift truck 10 is higher. The controller 81 derives the predicted orbit T from the forklift truck 10 to the orbit derived threshold value YT. With regard to the point in which as the vehicle speed of the forklift truck 10 is higher, the predicted orbit T extends longer in the travel direction of the forklift truck 10, the vehicle speed of the forklift truck 10 need not be in proportion to a length of the predicted orbit T extending in the travel direction of the forklift truck 10. The vehicle speed of the forklift truck 10 and the length of the predicted orbit T extending in the travel direction of the forklift truck 10 only need have a correlation in which as the vehicle speed of the forklift truck 10 is higher, the predicted orbit T extends longer in the travel direction of the forklift truck 10. The predicted orbit T is derived within the alarm area AA1.

<Alarm Control>

The following will describe the alarm control of the present embodiment. The alarm control is repeated every specified control period.

Figure 9:
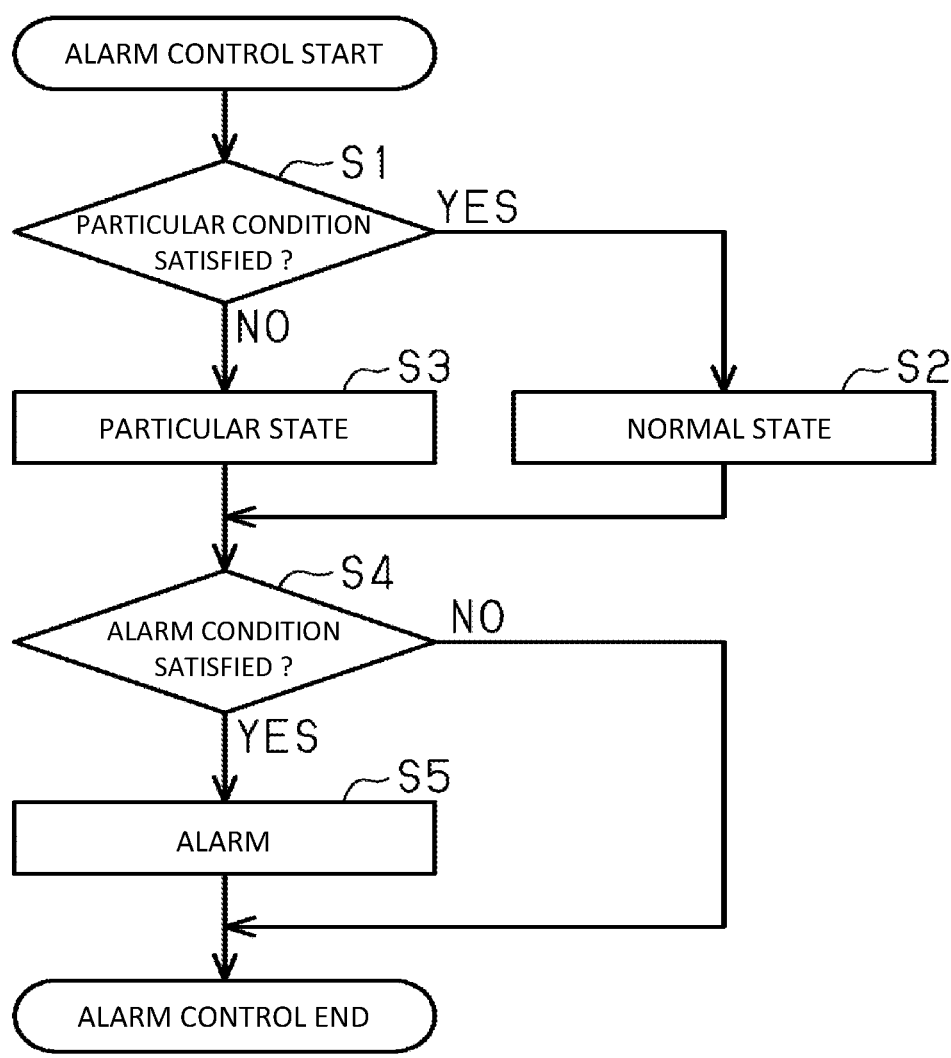
FIG. 9 is a flowchart showing an alarm control of the forklift truck.

As illustrated in FIG. 9, in Step S1, the controller 81 determines whether a particular condition is satisfied. The particular condition is that a state in which the vehicle speed of the forklift truck 10 is lower than a first vehicle speed threshold value continues for a predetermined time. The vehicle speed of the forklift truck is an absolute value of a speed calculated using the detection result of the vehicle speed sensor 62. The first vehicle speed threshold value may be set to any value. In the present embodiment, the first vehicle speed threshold value is lower than the second vehicle speed threshold value. The predetermined time is longer than the control period. The predetermined time is set such that the controller 81 does not determine that the particular condition is satisfied when the vehicle speed of the forklift truck 10 is determined to be momentary lower than the first vehicle speed threshold value despite the vehicle speed of the forklift truck 10 equal to or higher than the first vehicle speed threshold value, which is caused by an effect of noise. When the detection result in Step S1 is YES, the controller 81 proceeds to Step S2. When the detection result in Step S1 is NO, the controller 81 proceeds to Step S3. When the particular condition is not satisfied, the vehicle speed of the forklift truck 10 is equal to or higher than the first vehicle speed threshold value. That is, the process in Step S3 is performed when the vehicle speed of the forklift truck 10 is higher than the first vehicle speed threshold value.

In Step S2, the controller 81 is set in a normal state. In the normal state, the controller 81 determines the travel direction of the forklift truck 10 from the detection result of the direction switch 90. The controller 81 determines that the travel direction of the forklift truck 10 is the forward travel direction when the direction lever 89 is in the forward position. The controller 81 determines that the travel direction of the forklift truck 10 is the rearward travel direction when the direction lever 89 is in the rearward position. The controller 81 ends the process in Step S2, and then, proceeds to Step S4.

In Step S3, the controller 81 is set in a particular state. In the particular state, even when the travel direction command is changed by the direction lever 89, the controller 81 recognizes that a traveling state of the forklift truck 10 before the travel direction command is changed continues. When the travel direction command in the last control period is the forward travel command, the controller 81 determines that the forward travel command continues even when the rearward travel command is input by the direction switch 90. When the travel direction command in the last control period is the rearward travel command, the controller 81 determines that the rearward travel command continues even when the forward travel command is input by the direction switch 90. That is, while the particular state continues, the travel direction command does not change depending on the operation of the direction lever 89. When the controller 81 is set in the particular state, the vehicle speed is equal to or higher than the first vehicle speed threshold value. The second vehicle speed threshold value is larger than the first vehicle speed threshold value. Thus, the controller 81 sets the power transmission 40 in the driving force non-transmission state when the controller 81 is in the particular state and the vehicle speed of the forklift truck 10 is equal to or higher than the second vehicle speed threshold value. The controller 81 ends the process in Step S3, and then, proceeds to Step S4.

In Step S4, the controller 81 determines whether the alarm condition is satisfied. The alarm condition is provided to determine whether the alarm 136 issues an alarm. The alarm condition is satisfied when there is a possibility that the forklift truck 10 and the object are brought into contact with each other. The alarm condition is changed depending on whether the object is a person or an obstacle. When the detection result in Step S4 is YES, that is, the alarm condition is satisfied, the controller 81 proceeds to Step S5. In Step S5, the controller 81 causes the alarm 136 to issue an alarm. The following will describe the alarm condition of the present embodiment. The travel direction used for the determination of the alarm condition is changed depending on whether the controller 81 is in the normal state or in the particular state. When the controller 81 is in the normal state, the travel direction of the forklift truck 10 is determined from the detection result of the direction switch 90. When the controller 81 is in the particular state, the travel direction of the forklift truck 10 is determined from the travel direction command in the last control period. In the particular state, the controller 81 determines whether there is the possibility that the object and the forklift truck 10 are brought into contact with each other based on the traveling state of the forklift truck 10 before the travel direction command is changed.

<Case where the Object is a Person>

The alarm condition when the object is a person is that the forklift truck 10 travels rearward and the person is present in the alarm area AA1. When the object detected by the object detector 131 is a person, the alarm 136 issues an alarm when the forklift truck 10 travels rearward and the person is present in the alarm area AA1. Here, when a person is present in the predicted orbit T, the alarm may be intensified as compared with the case where the people is present outside the predicted orbit T. In order to intensify the alarm, for example, when the alarm 136 is a buzzer, the buzzer is sounded louder. When the alarm 136 is a combination of a lamp and a buzzer, the alarm using one of the lamp and the buzzer may be switched to the alarm using both the lamp and the buzzer. With this mechanism, the driver may easily recognize that the object is present in the predicted orbit T.

<Case where the Object is an Obstacle>

The alarm condition when the object is an obstacle is that the forklift truck travels rearward and the obstacle is present in the predicted orbit T. When the object detected by the object detector 131 is an obstacle, the alarm 136 issues an alarm when the forklift truck 10 travels rearward and the obstacle is present in the predicted orbit T.

Operation in the Embodiment

Figure 10:
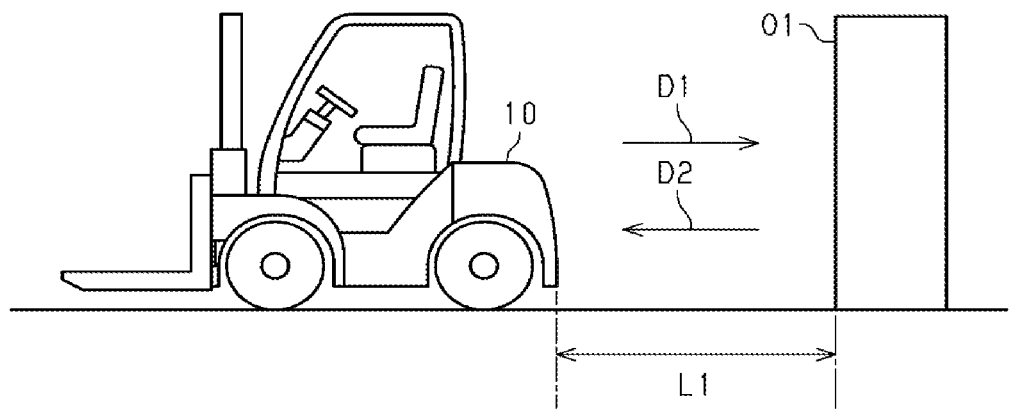
FIG. 10 is a schematic view for explaining an operation of the embodiment.

As illustrated in FIG. 10, the forklift truck 10 travels rearward and an object O1 is present in the rear of the forklift truck 10. The arrow D1 indicates the actual travel direction of the forklift truck 10. The arrow D2 indicates the travel direction of the forklift truck 10 recognized by the controller 81. When the driver of the forklift truck 10 performs the switchback operation, the rearward travel command is switched to the forward travel command by the direction lever 89. When the travel direction of the forklift truck 10 is switched, the vehicle speed of the forklift truck 10 decreases. For example, when the travel direction of the forklift truck 10 is switched from the rearward travel direction to the forward travel direction, the position of the direction lever 89 is changed to the forward travel position, and then, the vehicle speed of the forklift truck 10 decreases. In response to the vehicle speed of the forklift truck 10 reaching 0 km/h, the travel direction of the forklift truck is switched to the forward travel direction. When the travel direction command is changed by the direction lever 89 at the vehicle speed of the forklift truck 10 equal to or higher than the first vehicle speed threshold value, the travel direction of the forklift truck 10 is maintained at least until the vehicle speed of the forklift truck 10 is lower than the first vehicle speed threshold value.

The following will assume that the controller 81 is maintained in the normal state regardless of the vehicle speed of the forklift truck 10. When the position of the direction lever 89 is changed to the forward travel position, the controller 81 recognizes the actual travel direction of the forklift truck 10 as the forward travel direction. Here, even when the forklift truck 10 actually continues to travel rearward, the alarm issued by the alarm 136 stops at the point when the position of the direction lever 89 is changed to the forward travel position. That is, although a distance L1 between the forklift truck 10 and the object O1 decreases, the alarm issued by the alarm 136 stops at the point when the position of the direction lever 89 is changed to the forward travel position.

Figure 11:
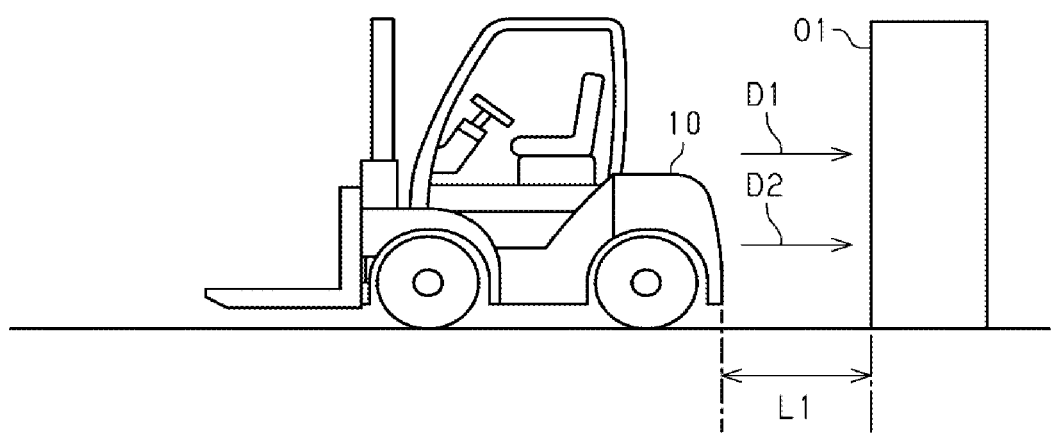
FIG. 11 is a schematic view for explaining the operation of the embodiment.

In contrast, in the present embodiment, when the vehicle speed of the forklift truck 10 is equal to or higher than the first vehicle speed threshold value, the controller 81 is set in the particular state. In the particular state, even when the travel direction command is changed by the direction lever 89, the controller 81 recognizes that the traveling state of the forklift truck 10 before the travel direction command is changed continues. As illustrated in FIG. 11, even when the rearward travel command is changed to the forward travel command by the switchback operation of the forklift truck 10, the controller 81 recognizes that the rearward travel command continues. Thus, the controller 81 recognizes that the travel direction of the forklift truck 10 is the rearward travel direction until the vehicle speed of the forklift truck 10 is lower than the first vehicle speed threshold value. Even when the travel direction command is changed by the direction lever 89, the object detector 131 operates based on the traveling state before the travel direction command is changed, so that the object is detectable in correspondence with the travel direction of the forklift truck 10. The operating of the object detector 131 means that the object detector 131 detects the position of the object present in the travel direction of the forklift truck 10. Even when the forklift truck continues to travel inertially, the alarm issued by the alarm 136 is continuable until the vehicle speed of the forklift truck 10 is lower than the first vehicle speed threshold value. In a case where the conditions of the vehicle speed of the forklift truck 10, and the like when the switchback operation is performed are the same as those in FIG. 10, the distance L1 between the forklift truck 10 and the object O1 when the alarm issued by the alarm 136 stops may be shorten as compared with the case illustrated in FIG. 10.

Advantageous Effects in the Present Embodiment (1) When the vehicle speed of the forklift truck 10 is equal to or higher than the first vehicle speed threshold value, the controller 81 is set in the particular state. Even when the travel direction command is changed by the direction lever 89, the controller 81 recognizes that the travel direction of the forklift truck 10 is maintained until the vehicle speed of the forklift truck 10 is lower than the first vehicle speed threshold value. As compared with the case where the controller 81 recognizes the travel direction of the forklift truck 10 based on an operation position of the direction lever 89 regardless of the vehicle speed of the forklift truck 10, it is possible to prevent a discrepancy between the travel direction of the forklift truck recognized by the controller 81 and the actual travel direction of the forklift truck 10. The object detector 131 operates based on the travel direction recognized as described above, so that the object is detectable in correspondence with the travel direction of the forklift truck 10.

(2) The controller 81, when the travel direction command is changed by the direction lever 89 in the particular state, determines whether there is the possibility that the object and the forklift truck 10 are brought into contact with each other, based on the travel direction before the travel direction command is changed. When the controller 81 performs the switchback operation, this prevents the alarm 136 from stopping to issue an alarm despite the forklift truck 10 approaching the object.

(3) The controller 81, in the particular state, sets the power transmission in the driving force non-transmission state. In the embodiment, the controller 81 sets the power transmission 40 in the driving force non-transmission state when the vehicle speed of the forklift truck 10 is within a speed range in which the controller 81 is set in the particular state and equal to or higher than the second vehicle speed threshold value. When the power transmission 40 is in the driving force non-transmission state, in the switchback operation, the time from a point when the direction lever 89 is operated until the travel direction of the forklift truck is switched becomes longer. For example, when the travel direction of the forklift truck 10 is the rearward travel direction, the rearward travel direction is switched to the forward travel direction by the direction lever 89. Here, when the power transmission 40 is in the driving force non-transmission state, the distance by which the forklift truck 10 inertially travels rearward becomes longer. In other word, the distance required for switching the travel direction of the forklift truck 10 from the rearward travel direction to the forward travel direction becomes longer. As a result, when the controller 81 is maintained in the normal state regardless of the vehicle speed of the forklift truck 10, the distance by which the forklift truck 10 travels with the discrepancy between the travel direction of the forklift truck 10 recognized by the controller 81 and the actual travel direction of the forklift truck becomes longer. When the alarm 136 issues an alarm in the case where there is the possibility that the object and the forklift truck 10 are brought into contact with each other, the distance by which the forklift truck 10 travels while the alarm 136 does not issue an alarm despite the forklift truck 10 approaching the object becomes longer. In contrast, the distance by which the forklift truck 10 travels with the discrepancy between the travel direction of the forklift truck 10 recognized by the controller 81 and the actual travel direction of the forklift truck 10 becomes shorter by setting the controller 81 in the particular state. That is, when the alarm 136 issues an alarm in the case where there is the possibility that the object and the forklift truck 10 are brought into contact with each other, the distance by which the forklift truck 10 travels while the alarm 136 does not issue an alarm despite the forklift truck 10 approaching the object becomes shorter.

(4) The controller 81 sets the power transmission 40 in the driving force non-transmission state by the interlock 110 when the travel direction command is changed by the direction lever 89 at the vehicle speed of the forklift truck 10 equal to or higher than the second vehicle speed threshold value. The interlock 110 is provided so as to reduce the load on the power transmission 40 when the switchback operation is performed at the vehicle speed equal to or higher than the second vehicle speed threshold value. On the other hand, the time from the point when the direction lever 89 is operated until the travel direction of the forklift truck is switched becomes longer when the switchback operation is performed at the vehicle speed of the forklift truck 10 equal to or higher than the second vehicle speed threshold value. The first vehicle speed threshold value is set lower than the second vehicle speed threshold value. When the switchback operation is performed at the vehicle speed of the forklift truck 10 equal to or higher than the second vehicle speed threshold value, this configuration enables the controller 81 to recognize that the travel direction of the forklift truck 10 is maintained from a point when the switchback operation is performed until the vehicle speed of the forklift truck 10 is lower than the first vehicle speed threshold value. Thus, the controller 81 prevents the discrepancy between the travel direction of the forklift truck 10 recognized by the controller 81 and the actual travel direction of the forklift truck 10.

(5) The particular condition is that a state in which the vehicle speed of the forklift truck 10 is lower than the first vehicle speed threshold value continues for the predetermined time. The vehicle speed of the forklift truck 10 may be determined to be momentary lower than the first vehicle speed threshold value despite the vehicle speed of the forklift truck 10 equal to or higher than the first vehicle speed threshold value, which is caused by an effect of noise. The erroneous determination of the controller 81 caused by the effect of noise is prevented by the particular condition, which is continuation of the predetermined time.

Modified Example

The embodiment may be modified as follows. The embodiment and the following modified examples may be combined with each other as long as they do not technically contradict each other.

Figure 12:
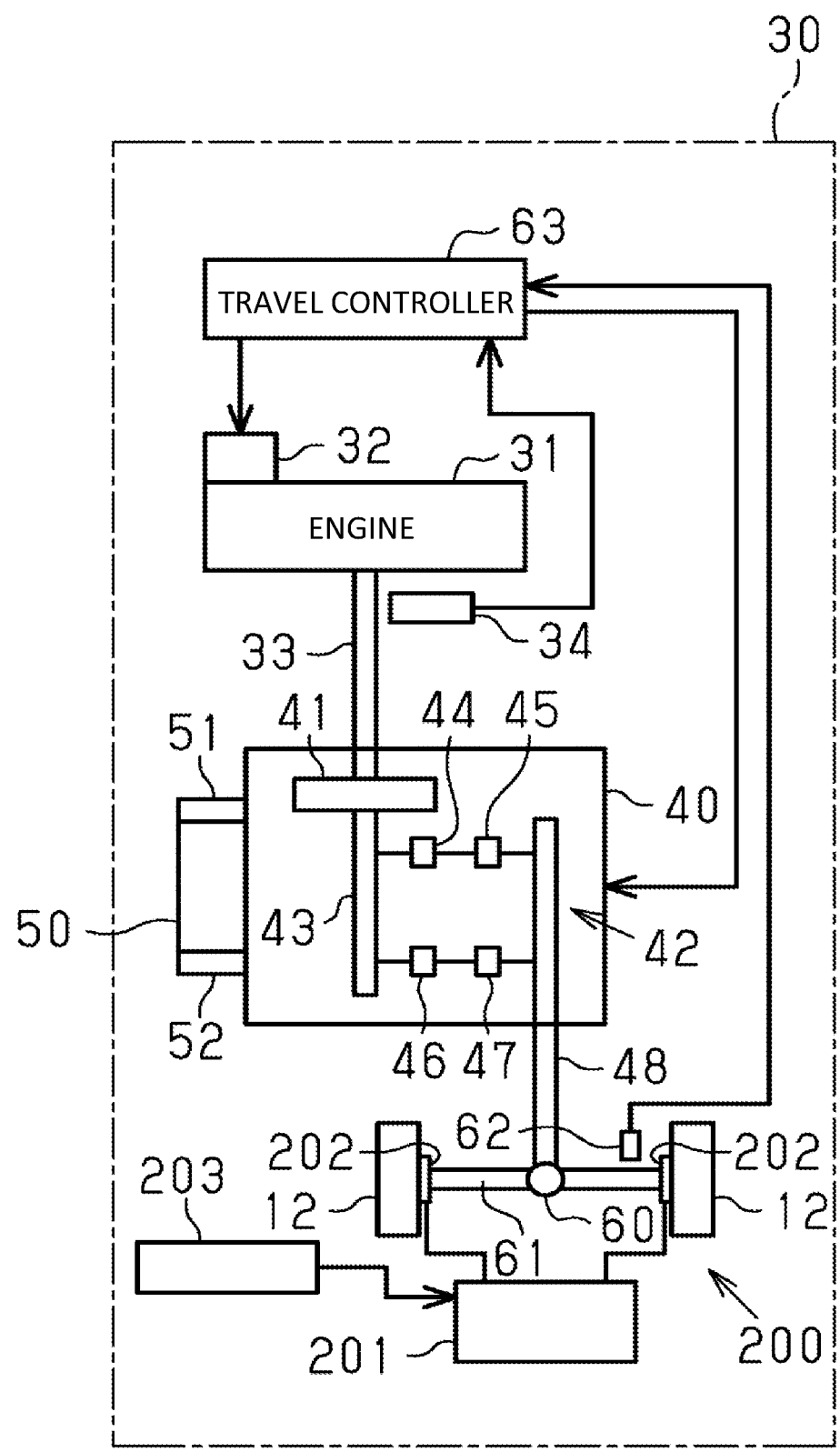
FIG. 12 is a block diagram schematically illustrating a forklift truck according to a modified example of the present disclosure.

As illustrated in FIG. 12, the traveling system 30 may include a brake mechanism 200. The brake mechanism 200 includes a brake actuator 201, brake wheel cylinders 202, and a brake controller 203.

The brake actuator 201 is an actuator that controls hydraulic oil to be supplied to the brake wheel cylinders 202. The brake actuator 201 controls the supply of the hydraulic oil with a solenoid valve, for example.

The brake wheel cylinders 202 are provided in the driving wheels 12, respectively. The brake wheel cylinders 202 may be provided in the steering wheels 14, respectively. The brake wheel cylinders 202 each press a brake pad against brake discs with the hydraulic oil supplied from the brake actuator 201 to generate a friction braking force.

A hardware configuration of the brake controller 203 is the same as that of the controller 81, for example. The brake controller 203 controls the brake actuator 201 upon reception of a command from the controller 81. Thus, the controller 81 controls the brake mechanism 200 by transmitting the command to the brake controller 203.

The controller 81, in the particular state, may apply the braking force to the forklift truck 10 by controlling the brake mechanism 200, instead of a control in which the power transmission 40 is set in the driving force non-transmission state. The controller 81, in the particular state, may apply the braking force to the forklift truck 10 by controlling the brake mechanism 200, in addition to the control in which the power transmission 40 is set in the driving force non-transmission state.

The controller 81 need not set the power transmission 40 in the driving force non-transmission state in the particular state. In this case, the forklift truck 10 need not include the interlock 110.

The alarm condition need not be changed depending on whether the object is a person or an obstacle. In this case, the detector 133 need not perform a person detection process. The alarm condition may be that the forklift truck 10 travels rearward and the object is present within the predicted orbit T. The alarm condition may be that the forklift truck 10 travels rearward and the object is present within the alarm area AA1. When the predicted orbit T is not used as the alarm condition, the controller 81 need not derive the predicted orbit T.

The controller 81 may perform a control for decreasing the vehicle speed of the forklift truck 10 by recognizing the travel direction of the forklift truck 10. For example, when the alarm condition is satisfied, the controller 81 may perform the control for decreasing the vehicle speed of the forklift truck 10. Here, the alarm 136 may or need not issue an alarm.

The controller 81 may use an inching valve to set the power transmission in the driving force non-transmission state. The inching valve performs an adjustment such that the driving force of the engine 31 is distributed to the power transmission 40 or to the hydraulic pump. The inching valve may perform an adjustment such that the driving force of the engine 31 is not distributed to the power transmission 40 so that the power transmission 40 is set in the driving force non-transmission state.

The particular condition may be that the vehicle speed of the forklift truck is lower than the first vehicle speed threshold value.

The power transmission 40 may be switchable between the driving force transmission state and the driving force non-transmission state upon reception of a command from the controller 81. In this case, when the switchback operation is performed, the controller 81 may give the command to the power transmission so that the power transmission 40 is set in the driving force non-transmission state.

The object detector 131 may detect a position of an object present in the forward travel direction of the travel direction of the forklift truck 10. In this case, the stereo camera 132 is disposed so as to orient the front of the forklift truck 10. When the position of the object present in the forward travel direction of the forklift truck 10 is detected by the object detector 131, the alarm area AA1 is defined as an area expanding forward from the forklift truck 10. Here, in the alarm control, "rear" and "front" described in the embodiment are replaced with each other.

The object detector 131 may detect a position of an object present in both the forward travel direction and the rear travel direction of the travel direction of the forklift truck 10. For example, a stereo camera for capturing the front of the forklift truck 10 and a stereo camera for capturing the rear of the forklift truck 10 or a fish-eye camera may be disposed. In this case, the alarm area AA1 includes a forward area expanding forward from the forklift truck 10 and a rearward area expanding rearward from the forklift truck 10. The controller 81 changes the alarm condition in accordance with the travel direction of the forklift truck 10. For example, the controller 81, when the travel direction of the forklift truck 10 is the rearward travel direction, causes the alarm 136 to issue an alarm based on the alarm condition which is the same as that in the embodiment. The controller 81, when the travel direction of the forklift truck 10 is the forward travel direction, causes the alarm 136 to issue an alarm based on the alarm condition in which the rearward travel is replaced with the forward travel in the alarm condition of the embodiment.

Any device may be used as the travel direction determiner as long as the device is operable by the driver of the forklift truck 10. The travel direction determiner may be, for example, a push-button.

A monocular camera, a ToF (Time of Flight) camera, a LIDAR (Laser Imaging Detection and Ranging), a millimeter wave radar, or the like may be used as the object detector 131, instead of the stereo camera 132. The object detector 131 may include a combination of a plurality of sensors, such as the stereo camera 132 and the LIDAR.

The alarm 136 may be provided in any device other than the object detector 131.

The alarm 136 may be directly operated by the controller 81.

The operation of the forklift truck 10 may be switchable between a manual mode and an automatic mode.

The forklift truck 10 may be an electric forklift truck that performs a travel operation by the motor.

The forklift truck 10 may perform both a vehicle speed command and determination of the travel direction by the direction lever. This type of forklift truck is a reach-type forklift truck, for example.

The rotational speed sensor 34 may be used as the travel direction detector.

The detector 133 may be used as the controller.

The industrial vehicle may be a tractor used for carrying loads, an order picker used in a picking work, or the like.

What is claimed is:

1. An industrial vehicle comprising:
   a travel direction detector configured to detect a travel direction of the industrial vehicle;
   a vehicle speed sensor configured to detect a vehicle speed of the industrial vehicle;
   a travel direction determiner configured to determine the travel direction of the industrial vehicle;
   an object detector configured to detect a position of an object present in the travel direction of the industrial vehicle; and
   a controller, wherein
   the controller is set in a particular state when the vehicle speed of the industrial vehicle is equal to or higher than a first vehicle speed threshold value,
   in the particular state, even when a travel direction command is changed by the travel direction determiner, the controller recognizes that a traveling state of the industrial vehicle before the travel direction command is changed continues and the object detector operates based on the traveling state of the industrial vehicle before the travel direction command is changed,
   the industrial vehicle includes an alarm that issues an alarm when there is a possibility that the object detected by the object detector and the industrial vehicle are brought into contact with each other,
   the controller determines, in the particular state, whether there is the possibility that the object and the industrial vehicle are brought into contact with each other based on the traveling state of the industrial vehicle before the travel direction command is changed,
   the controller derives a predicted orbit of the industrial vehicle,
   the predicted orbit extends from the industrial vehicle in a rear travel direction of the industrial vehicle when the industrial vehicle travels straight,
   the predicted orbit extends from the industrial vehicle in a direction in which the industrial vehicle turns when the industrial vehicle turns, and
   when the object is in the predicted orbit, the alarm issued by the alarm continues until the vehicle speed of the industrial vehicle is lower than the first vehicle speed threshold value.

2. The industrial vehicle according to claim 1, wherein
the industrial vehicle includes:
an engine; and
a power transmission,
the power transmission is switchable between a driving force transmission state where a driving force of the engine is transmitted to the power transmission and a driving force non-transmission state where the driving force of the engine is not transmitted to the power transmission, and
the controller, in the particular state, sets the power transmission in the driving force non-transmission state.

3. The industrial vehicle according to claim 2, wherein
the industrial vehicle includes an interlock that sets the power transmission in the driving force non-transmission state,
the controller sets the power transmission in the driving force non-transmission state by the interlock when the travel direction command is changed by the travel direction determiner at the vehicle speed of the forklift truck equal to or higher than the second vehicle speed threshold value, and
the first vehicle speed threshold value is set lower than the second vehicle speed threshold value.

4. An industrial vehicle comprising:
a travel direction detector configured to detect a travel direction of the industrial vehicle;
a vehicle speed sensor configured to detect a vehicle speed of the industrial vehicle;
a travel direction determiner configured to determine the travel direction of the industrial vehicle;
an object detector configured to detect a position of an object present in the travel direction of the industrial vehicle;
at least one memory configured to store computer program code; and
at least one processor configured to access the at least one memory and operate as instructed by the computer program code, the computer program code including control code, wherein
the control code configured to cause the at least one processor to be set in a particular state when the vehicle speed of the industrial vehicle is equal to or higher than a first vehicle speed threshold value, and
in the particular state, even when a travel direction command is changed by the travel direction determiner, the control code configured to cause the at least one processor to recognize that a traveling state of the industrial vehicle before the travel direction command is changed continues and the object detector operates based on the traveling state of the industrial vehicle before the travel direction command is changed,
the industrial vehicle includes an alarm that issues an alarm when there is a possibility that the object detected by the object detector and the industrial vehicle are brought into contact with each other,
the control code configured to cause the at least one processor to determine, in the particular state, whether there is the possibility that the object and the industrial vehicle are brought into contact with each other based on the traveling state of the industrial vehicle before the travel direction command is changed,
the control code configured to cause the at least one processor to derive a predicted orbit of the industrial vehicle,
the predicted orbit extends from the industrial vehicle in a rear travel direction of the industrial vehicle when the industrial vehicle travels straight,
the predicted orbit extends from the industrial vehicle in a direction in which the industrial vehicle turns when the industrial vehicle turns, and
when the object is in the predicted orbit, the alarm issued by the alarm continues until the vehicle speed of the industrial vehicle is lower than the first vehicle speed threshold value.

5. An industrial vehicle comprising:
a travel direction detector configured to detect a travel direction of the industrial vehicle;
a vehicle speed sensor configured to detect a vehicle speed of the industrial vehicle;
a travel direction determiner configured to determine the travel direction of the industrial vehicle;
an object detector configured to detect a position of an object present in the travel direction of the industrial vehicle; and
a controller, wherein
the controller is set in a particular state when the vehicle speed of the industrial vehicle is equal to or higher than a first vehicle speed threshold value,
in the particular state, even when a travel direction command is changed by the travel direction determiner, the controller recognizes that a traveling state of the industrial vehicle before the travel direction command is changed continues and the object detector operates based on the traveling state of the industrial vehicle before the travel direction command is changed,
the industrial vehicle further includes:
an engine; and
a power transmission,
the power transmission is switchable between a driving force transmission state where a driving force of the engine is transmitted to the power transmission and a driving force non-transmission state where the driving force of the engine is not transmitted to the power transmission, and
the controller, in the particular state, sets the power transmission in the driving force non-transmission state.

* * * * *